United States Patent [19]

Jones et al.

[11] Patent Number: 5,011,697

[45] Date of Patent: Apr. 30, 1991

[54] INHIBITING DEVELOPMENT OF MUTAGENS AND CARCINOGENS

[75] Inventors: Ronald C. Jones, Briafcliff Manor; John H. Weisburger, White Plains, both of N.Y.

[73] Assignee: American Health Foundation, Dana Road, N.Y.

[21] Appl. No.: 227,628

[22] Filed: Aug. 6, 1988

Related U.S. Application Data

[63] Continuation-in-part of Ser. No. 659, Jan. 6, 1987, Pat. No. 4,777,052.

[51] Int. Cl.$^5$ .................... A23L 1/305; A23L 1/314; A23L 3/34
[52] U.S. Cl. ...................................... 426/92; 426/302; 426/310; 426/323; 426/332; 426/652; 426/657; 514/323; 514/332.1
[58] Field of Search ................ 426/92, 323, 332, 657, 426/652, 302, 310; 514/332, 323

[56] References Cited

U.S. PATENT DOCUMENTS

| | | | |
|---|---|---|---|
| 3,681,095 | 8/1972 | Intlaar | 426/323 |
| 3,840,676 | 10/1974 | Yamamoto et al. | 426/92 |
| 3,911,146 | 10/1975 | Hara et al. | 426/332 |
| 4,521,435 | 6/1985 | Peters | 426/921 |

OTHER PUBLICATIONS

The Merck Judex, "Proline", Merck & Co. Inc., Rahway N.J. 1968 p. 869.

*Primary Examiner*—Jeanette Hunter
*Attorney, Agent, or Firm*—Ladas & Parry

[57] ABSTRACT

L-Tryptophan is applied to foodstuff to prevent the development of mutagens/carcinogens. Before the cooking of a foodstuff such as hamburger, L-Tryptophan is applied to the surfaces thereof to inhibit, for example, the generation of IQ type carcinogens. The L-Tryptophan can be sprinkled on the surface of the foodstuff or incorporated into a sauce which is applied to the foodstuff or put into solution in water or the like.

Other non-toxic indoles such as L-proline have identical properties in specifically blocking the formation of heterocyclic amino type mutagens and carcinogens, as do mixtures of L-tryptophan and L-proline.

20 Claims, 3 Drawing Sheets

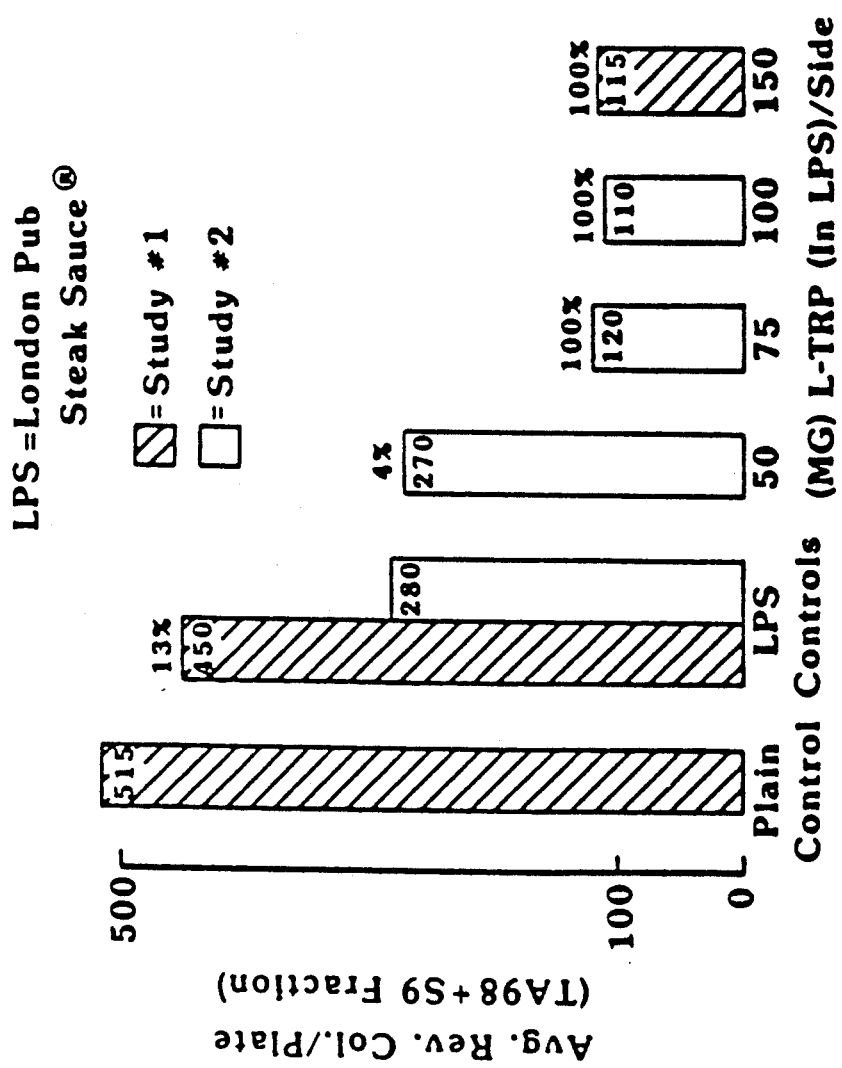
Figure 2. % Inhibition of IQ-Type Mutagenicity by Various Levels of L-Tryptophan in London Pub Steak Sauce Using Broiled Lean-Ground Beef Patty Model

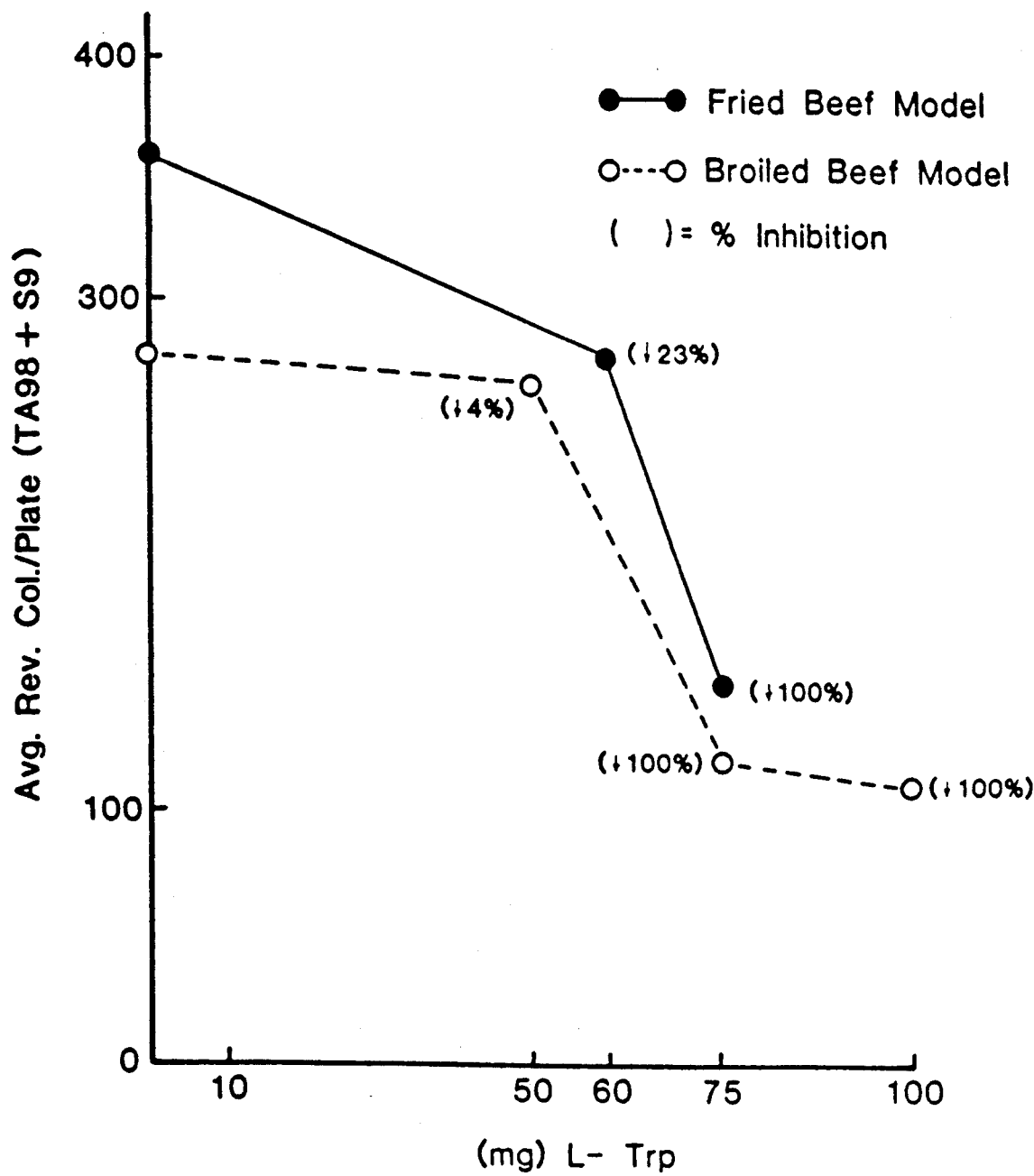

INHIBITING DEVELOPMENT OF MUTAGENS AND CARCINOGENS

OTHER APPLICATIONS

This application is a continuation-in-part of our earlier filed copending application Ser. No. 000,659 filed Jan. 6, 1987, now U.S. Pat. No. 4,777,052.

FIELD OF INVENTION

This invention relates to methods of pretreating foodstuffs and, more particularly, to the processing of proteinaceous foodstuffs to avoid the generation of mutagens/carcinogens during cooking. The invention also relates to compounds which are applied to proteinaceous foods to avoid the generation of mutagens or carcinogens during cooking, especially by frying, broiling, or baking.

BACKGROUND

Important forms of human cancer stem from exposure to mutagens and carcinogens and in particular to the intake of such agents in foods. A new field of research was opened with the discovery in 1977 that frying or broiling, or similar high temperature modes of cooking, produce carcinogens from precursors in foods, particularly foods such as meat or fish. Sugimura T: Carcinogenicity of mutagenic heterocyclic amines formed during the cooking process. Mutat. Res. 150.33–41, 1985. Research on these powerful mutagens has demonstrated that these chemicals are carcinogens for target organs such as the breast and intestinal tract. Tanaka T., Barness W. S., Weisburger J. H., Williams G. M.: Multipotential carcinogenicity of the fried food mutagen 2-amino-3-methylimidazo[4,5-f]quinoline (IQ) in rats. Jap. J. Cancer Res. (Gann) 76:P570–576, 1985.

In the field of cancer research, Applicants have been engaged in developing reliable information on causes of cancer as sound means of preventing cancer by avoiding or eliminating the causes so pinpointed. Weisburger J. H., Wynder E. L.: The role of genotoxic carcinogens and of promoters in carcinogenesis and in human cancer causation. Acta Pharmacologica et Toxicologica 55 (suppl II):53–68, 1984. Weisburger J. H.: Mechanisms of nutritional carcinogenesis associated with specific human cancers. ISI Atlas of Science: Pharmacology 1:162–167, 1987.

Based on many lines of evidence, including studies in epidemiology, geographic pathology, and laboratory studies, it has been demonstrated that certain nutritional parameters are involved in the causation of several of the important and major forms of human cancer, including cancer of the breast, pancreas, and intestinal tract. Weisburger J. H.: Mechanisms of nutritional carcinogenesis associated with specific human cancers. ISI Atlas of Science: Pharmacology 1:162–167, 1987. Reddy B. S., Cohen L. A., McCoy G. D., Hill P. Weisburger J. H., Wynder E. L.: Nutrition and its relationship to cancer. Adv. Cancer Res. 32:237–345, 1980. One area of research has demonstrated that the amount of total fat intake is associated with these kinds of cancer. It has been established that the role of fat is indirect through various mechanisms that act in enhancing or promoting such factors. Ready B. S., Cohen L. A., McCoy G. D., Hill P., Weisburger J. H., Wynder E. L.: Nutrition and its relationship to cancer. Adv. Cancer Res. 32:237–345, 1980. Such elements are not direct causes of cancer.

Until 1977, the actual specific cancer-causing entities for these target organs were not only known but also there was no working hypothesis as to their nature. This situation changed with the discovery by Takashi Sugimura, M.D. and his associates at the National Cancer Center Research Institute in Tokyo who discovered that the surface of fried fish and fried meat contained powerful mutagens, i.e., agents capable of changing the genetic apparatus of cells. Sugimura T., Nagao M., Kawachi T., Honda M., Yahagi T. Seino Y., Satos S., Matsukura N., Matsushima T., Shirai A., Sawamura M., Matsumoto H.: Mutagen-carcinogens in food, with special reference to highly mutagenic pyrolytic products in broiled foods. In Hiatt H. H., Watson J. D., K. D., Winsten J. A. (eds): Origins of Human Cancer, Book C, pp. 1561–1577. Cold Spring Harbor, N.Y.: Cold Spring Harbor Lab., 1977. A mutagenic agent is often found to be carcinogenic, i.e., cancer causing, and therefore any mutagen can be suspected of being potentially carcinogenic. In collaboration with Dr. Sugimura, Applicants established methods to separate and identify this novel class of mutagens, an activity that was successful. In the last ten years a number of mutagenic chemicals formed during the cooking (frying, broiling, baking) of protein-containing foods, especially fish and meat, were identified and were found to belong to a novel class of heterocyclic amines and imidazoazaarene compounds. Knudsen I. (Ed.): Genetic Toxicology of the Diet. New York: Alan Liss Inc., 1986. Hatch F. T. et al: Nishimura, S., Powrie, W. D. & Kolonel, L. N. (eds.) Dietary Mutagens, A Symposium I. Genetically relevant endpoints. Environmental Health Perspect. 67:3–157, 1986. Felton J. S., Knize M. G., Shen N. H., Lewis P. R., Andersen B. D., Happe J., Hatch F. T.: The isolation and identification of a new mutagen from fried ground beef: 2-amino-1-methyl-6-phenylimidazo-[4,5-b]pyridine (PhIP). Carcinogenesis 7:1081–1086, 1986. Vuolo L. L., Schuessler G. J.: Review: Putative mutagens and carcinogens in foods. VI. Protein pyrolysate products. Environ. Mutagenesis 7:577–598, 1985. A number of such compounds have found to be highly mutagenic. They were active in other tests delineating potential cancer-causing ability, and when tested in appropriate animal models were found to actually cause cancer in target organs such as breast, pancreas, and intestinal tract. Sugimura T.: Carcinogenicity of mutagenic heterocyclic amines formed during the cooking process. Mutat. Res. 150:33–41, 1985. Tanaka T., Barnes W. S., Weisburger J. H., Williams G. M.: Multipotential carcinogenicity of the fried food mutagen 2-amino-3-methylimidazo[4,5-f]quinoline (IQ) in rats. Jap. 3. Cancer Res. (Gann) 76:570–576, 1985.

It was therefore postulated that cooking by broiling and frying of meats or fish leads to carcinogens that are cancer-causing agents for the organs of the intestinal tract and breast, with other dietary components such as the level and type of fat exerting an enhancing effect. Weisburger J. H.: Mechanisms of nutritional carcinogenesis associated with specific human cancers. ISI Atlas of Science: Pharmacology 1:162–167, 1987. In this general field, it has been accepted that prevention of important forms of cancer optimally consists of removing the carcinogens associated with each type of cancer from the environment. Therefore, Applicants have made great efforts to study the mode of formation of these mutagens and carcinogens during cooking. Applicants, as well as the group of Jagerstad in Sweden Taylor, Felton, Hatch and associates in California, and the group of Matsushima and Sugimura in Japan, have contributed to this field. Knudsen I. (Ed).): Genetic Toxology of the Diet. New York: Alan Liss Inc., 1986 (see above). Nishimura, S., Powrie, W. D. & Kolonel, L. N. (eds.) Food Mutagens, A Symposium I. Genetically relevant endpoints. Environmental Health Perspect. 67:3-157, 1986. Felton J. S., Knize M. G., Shen N. H., Lewis P. R., Andresen B. D., Happe J., Hatch F. T.: The isolation and identification of a new mutagen from fried ground beef: 2-amino-1-methyl-6-phenylimidazo-[4,5-b]pyridine (PhIP). Carcinogenesis 7:1081-1086, 1986. All those concerned with the mode of formation of these chemicals during cooking agree that an essential component is the presence of creatine or creatinine in the foodstuff. Vuolo L. L., Schuessler G. J.: Review: Putative mutagens and carcinogens in foods. VI. Protein pyrolysate products. Reutersward A. L., Skog K., Jagerstad: Effects of creatine and creatinine content on the mutagenic activity of meat extracts, bouillions and gravies from different sources. Fd. Chem. Toxic. 23:747-754, 1987. Creatinine reacts in a series of very complex interactions with certain precursors to form the mutagens and carcinogens typified by the family of aminomethylimidazoquinolines or quinoxalines and related aminoimidazoazaarenes. This entire field of research is only ten years old and relatively few institutions in the world have contributed to advances in this area. Knudsen I. (Ed.): Genetic Toxicology of the Diet. New York: Alan Liss Inc., 1986. Hatch F. T. et al.

Patents are known in which certain meats are treated for quite distinct, unrelated goals. These patents include U.S. Pat. No. 3,681,095 (Aug. 1972) involving the use of certain amino acids on meats to aid in preserving meats during dehydration and permitting ready reconstitution. Clearly, this patent does not deal with the specific use of indole-type amino acids in preventing the formation of mutagens as will be detailed below in the description of the invention.

U.S. Pat. No. 3,840,676 (Oct. 8, 1974) deals with the use of mixtures including certain amino acids to create a film at the surface of meats to prevent the putrefaction and oxidation of such meats. Clearly, this particular process does not have any relationship to the present invention dealing with the specific property of proline and tryptophan in blocking mutagen formation.

U.S. Pat. No. 3,911,146 (Oct. 7, 1975) uses certain vegetable ingredients and also amino acids to preserve the color of red meats as replacement for nitrite or nitrate. Clearly, this particular application of amino acids is distinct from the current finding that specific, indole ring-containing amino acids block the formation of mutagens.

U.S. Pat. No. 4,521,435 (June 4, 1985) deals with the application of a coating, including 30% by weight of dried powdered egg whites, to hamburger-type meat patties for the purpose of forming a coating to seal in the meat juices and thus reduce weight loss during cooking. Clearly, this particular process is quite distinct in purpose and application from the specific inhibition of mutagen and carcinogen formation during cooking by specific reactions between the compounds applied and components formed during cooking.

SUMMARY OF INVENTION

Applicants have made the important new discovery, which is the subject of this invention, that the addition of certain indoles, typically the amino acids L-tryptophan (L-trp) and L-proline (L-pro) individually or in mixtures, serve to provide powerful competitors to the reaction of creatinine with precursor molecules during cooking. This competition by indoles such as L-tryptophan or L-proline forms agents that are not mutagenic and not carcinogenic. In other words the heat-generated reactive intermediates in foods being cooked are trapped by the indoles and are therefore not available in sufficient concentrations to react with creatinine. Thus, the carcinogenic aminomethylquinolines, -quinoxalines, and imidazoazaarenes of this class do not form, or are produced in trivial amounts.

A key objective of the present discovery is to provide a ready and reliable process for inhibiting the formation of mutagens and carcinogens during the cooking of meats and fish. The formation of these novel carcinogens of the general class of aminoimidazoazaarenes or aminomethylimidazoquinolines or quinoxalines depends strongly on the reaction of the intermediates with creatinine. In accordance with the information obtained in the Applicants' new research, it is established that certain indoles such as L-tryptophan, L-proline or mixtures thereof are excellent competitors for the reactive intermediates, withdrawing these during cooking and making them unavailable for the reaction with creatinine. Therefore included in Applicant's discovery is a process, the prior addition of L-tryptophan, L-proline and related indoles, or mixtures thereof, to block and reliably inhibit the formation of the named types of mutagens and carcinogens in model laboratory situations and in the actual frying, broiling, or baking of foodstuffs, especially meat and fish.

It is further objective of the invention to provide a method involving the application of L-tryptophan, L-proline or mixtures of indoles to such foodstuffs prior to cooking (frying, broiling, or baking), so as to inhibit the production of mutagens and carcinogens.

Thus, the objective of the invention is to provide methods and procedures involving the application of inhibitor chemicals containing an indole ring in their structure, to foodstuffs like fish or meat prior to cooking that will prevent the formation of mutagens and carcinogens during ordinary cooking. The method of application can involve the use of a liquid medium or flavoring agents such as steak sauces and the like. In such a vehicle, the amount of L-tryptophan and L-proline applied should preferably be no less than 1.0 mg per $cm^2$ of foodstuff surface area for maximum effectiveness. The indoles to be used, especially L-tryptophan or L-proline or mixtures thereof, can be applied as a powder or incorporated into a vehicle or carrier such as commercial steak sauces. The foodstuff can, for example, be beef, fowl, pork, lamb, fish or other proteinaceous substances that are usually cooked by broiling, frying, or baking prior to eating. It has been established that that application of these indoles specified above to the foods mentioned prior to cooking avoids the formation of the specific mutagens and carcinogens during cooking. In the context of prevention of important forms of human cancer, this discovery is of great relevance in public health maintenance by specifically eliminating from foods eaten by man the above-mentioned carcinogens.

The above and other objects, features and advantages of the invention will be found in the Detailed Description which follows hereafter, as illustrated in the accompanying drawing:

BRIEF DESCRIPTION OF DRAWING

In the drawing:

FIG. 2 is a chart illustrating the inhibition of IQ-type mutagenicity by different dosages of L-trp;

FIG. 3 is a chart illustrating dose-dependent inhibition of IQ-type mutagenicity in fried and broiled beef;

FIG. 4 illustrates the formation of IQ-like mutagens resulting from heating L-threonine or acetaldehyde with creatinine;

FIG. 5 illustrates the sequence of reactions between glucose, alanine and creatinine;

FIG. 6 illustrates the interference by a typical indole in the sequence of reactions leading to 4,8-dimethyl-$IQ_x$.

DETAILED DESCRIPTION

Figure 1:
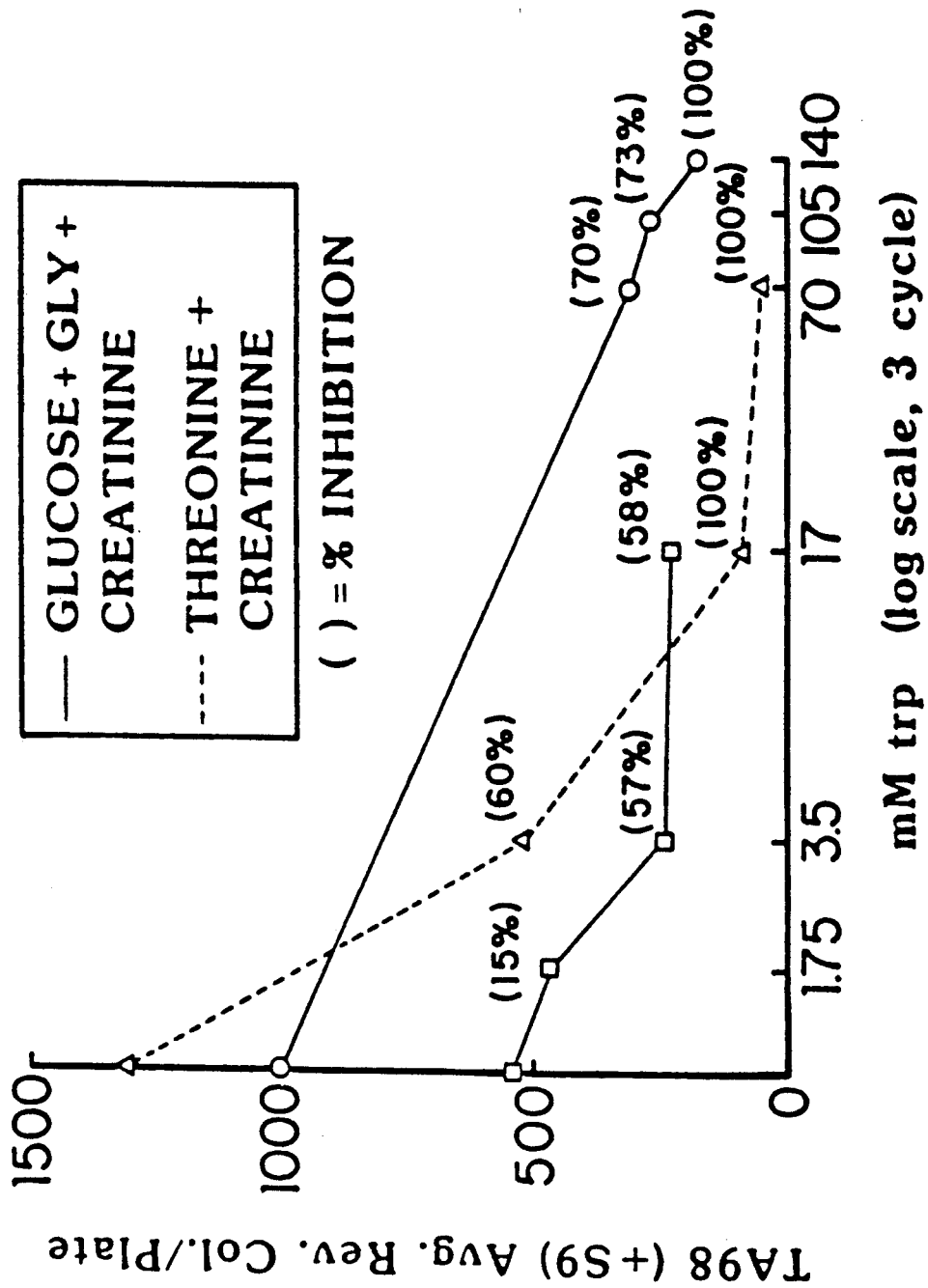
FIG. 1 is a chart illustrating the inhibition of mutagenicity in liquid reflux models.

IQ-type mutagenicity and carcinogenicity is typically that found in a series of compounds structurally related to IQ, including abut not limited to the 2-amino-3-methylimidazo[4,5-f]quinolines and quinoxalines, that are formed during various cooking procedures.

The specimens cooked and processed were done under highly controlled laboratory conditions with specific sample sizes. The procedures, however, will work, as described, on other sample sizes.

FIG. 1 shows an inhibition of mutagenicity by L-trp in liquid-reflux models. Numbers in parentheses are percent of inhibition; solid lines, complete model=-threonine+glycine and creatinine. Substates glucose (35 mM)+gly/(70 mM)+creatinine (70 mM), or threonine (70 mM)+creatinine (70 mM) are refluxed in diethylene glycol (DEG): 5% distilled water (60 ml total volume) at 150° C. for 2 hours. Number of revertant colonies/plate must be triple that of DEG control values to be considered significant.

FIG. 2 shows an inhibition of IQ-type mutagenicity by L-trp applied in a commercial steak sauce during broiling of lean ground beef. Shaded bars represent a first study (#1), while open bars represent a second study (#2). % Figures over bars=% inhibition, and numbers within bars are actual avg. rev. col./plate obtained when L-trp was mixed into commercial steak sauce (SS=LPS) at 0, 50, 75, 100, and 150 mg/2.5 m of sauce/side (0–2.0% mg L-trp/$cm^2$ patty surface area/side). 100% inhibition was achieved at 75 mg L-trp in 2.5 ml of SS/side (1.04 mg/$cm^2$). In both studies, #1 and #2, patties were broiled for 5 min/side at 235° C., in an overhead gas broiler.

FIG. 3 shows L-trp was blended into a commercial steak sauce at concentrations of: (1) 50, 75, and 100 mg in 2.5 ml of sauce/side, and applied to both meat surfaces prior to initial broiling (o—o) at 235° C., or (2) 60 and 75 mg in 2.5 ml of sauce side, and applied to both meat surfaces prior to initial frying (o—o) at 220° C. In both models, patties were cooked for 5 minutes/side. Percent inhibition of mutagenicity is noted in parenthesis. Dose-dependent inhibition of IQ-type mutagenicity was similar in both models with 100% inhibition at 75 mg L-trp in 2.5 ml of sauce/side.

Liquid-Reflux Models

Millimolar (mM) concentrations of various ingredients, such as glucose, glycine, creatinine with or without inhibitory test agent, were added to a medium consisting of diethylene glycol (DEG): 5% water (60 ml total volume), and refluxed for 2 hours at 150° C. The reflux models employed below were: (1) glucose (35 mM)+glycine (70 mM)+creatinine (70 mM)="complete" model, and (2) a new model discovered during these studies: threonine (70 mM)+creatinine (70 mM), also called, "critical" 2-component model.

Preparation of "standard" lean-ground beef patties

Patties 3 mm in thickness and 9.6 cm in diameter (72.35 $cm^2$ surface area/side) were prepared from 50 grams of store-bought 85% lean-ground beef using a glass Petri dish cover (1.5×9.6 cm, I.D.) as a mold. Inhibitor-treated and untreated patties were then either fried or broiled 5 minutes per side in all studies.

Frying and broiling methods

Frying study

Patties were fried, 5 minutes per side, in a Teflon-coated electric fry pan preheated for 20 minutes at 220° C. (maximum setting).

Broiling study

Patties were broiled in an overhead gas flame broiler (fixed flame setting), with the broiler tray placed in the lowest position (16 cm below the flame). The broiler was preheated for 20 minutes before use.

Temperature monitoring

A Digital Thermocouple Probe (model #8520-50, Cole-Palmer Instrument Co., Chicago, Ill.) was used to monitor interface temperatures as a function of time during frying, and interface as well as patty upper surface temperatures during gas broiling.

XAD-2 fractionation and acid/base partitioning

Threonine (70 mM) and creatinine (70 mM) were refluxed for 2 hours at 150° C. in DEG: 5% water. 15 ml of the final reflux sample, containing an unknown quantity of threonine/creatinine mutagenic product (TCP) was diluted with 10 volumes of distilled water ($H_2O$) ($DH_2O$) and concentrated on a small (1×32 cm) column of clean XAD-2 resin, as per Bjeldanes et al. Bjeldanes, (Bejeldanes, L. F., Grose, K. R., Davis, P. H., Stuermer, D. H., Healty, S. K., and Felton, J. S. (1982). An XAD-2 resin method for efficient extraction of mutagens from fried ground beef. Mutat. Res., 105, 43–49). Mutagenic TCP was eluted from the XAD-2 with 3 bed volumes (40 ml) of acetone and rotary evaporated in vacuo to dryness. The resulting residue was redissolved in 33 ml of 1N HCl, extracted twice in a separatory funnel with 2 volumes (70 ml) of (2:1) methylene chloride:methanol (MeOH) each, and once with 2 volumes of methylene chloride ($CH_2Cl_2$). After each extraction, the bottom organic layer containing neutral and acidic compounds was discarded, and the upper aqueous layer saved for further extraction, as modified per Felton et al. (Felton, J. S., Healy, S., Stuermer, D., Berry, C., Timourian, H., Hatch, F. T., Morris, M., and Bjeldanes, L. F. (1981). Mutagens from the cooking of food. I. Improved isolation and characterization of mutagenic fraction from cooked ground beef. Mutat. Res., 88, 33–44; Felton, J. S., Knize, M. G., Wood, C., Wuebbles, B. J., Healy, K. S., Stuermer, D. H., Bjeldanes, L. F., Kimble, B. J., and Hatch, F. T. (1984). Isolation and characterization of new mutagens from fried ground beef. Carcinogenesis, 5, 95–102) and Commoner et al. (Commoner, B., Vithayathil, A. J., Dolara, P., Nair, S., Madyastha, P., and Cuca, G. C. (1978). Formation of mutagens in beef and beef extract during cooking. Science, 201, 913–916). The final aqueous layer was then adjusted to pH 10 with 8N NaOH, and re-extracted 3 times, as described above. The pooled $CH_2Cl_2$ basic extract (bottom layer), known to contain the heterocyclic amine mutagens, when present, was rotary evaporated to dryness, and redissolved in 2 ml of dimethylsulfoxide (DMSO) for mutagenicity testing by Ames assay using tester strain TA98+S9 fraction.

Homogenization and acid/base partitioning of fried or broiled ground beef

Each patty, L-trp-treated or untreated, was homogenized in 4 volumes (90 ml) of acetone, using a blender speed of 18,000 rpm ("liquefy" setting) for 60 seconds (3 times). The acetone extract was vacuum filtered through Whatman No. 1 filter paper and a sintered glass funnel. The filtered residue was stirred with 100 ml of acetone for 30 minutes, and refiltered as described above. The filtrates were pooled and placed in a cold room at 4° C. for 5 hours to overnight to congeal sample lipids. Congealed samples were then refiltered and the acetone filtrate rotary evaporated to near dryness. The residue was dissolved in 33 ml 1N HCl and processed through acid/base partitioning, as per the method described above for threonine+creatinine reflux sample. The resultant basic extract was rotary evaporated to dryness, redissolved in 10 ml of methanol, and the sample injected through a methanol washed $C_{18}$ Sep-Pak cartridge using a glass syringe to remove residual lipids. The Sep-Pak filtered sample in methanol was then evaporated to dryness by a stream of nitrogen and redissolved in 1.0 ml of DMSO for Ames assay (TA98+S9).

Acidic nitrostation procedure

Selected broiled beef patty basic extracts, with or without L-trp treatment, were nitrosated at pH 1.0, as per Tsuda et al. (Tsuda, M., Negishi, C., Makino, R., Sato, S., Yamaizumi, Z., Hirayama, T. and Sugimura, T. (1985). Use of nitrite and hypochlorite treatments in determination of the contributions of IQ-type and non-IQ-type heterocyclic amines to the mutagenicities in crude pyrolyzed materials. Mutat. Res., 147, 335–341), to discriminate between IQ and non-IQ-type of mutagens. After Sep-Pak $C_{18}$ filtration of sample basic extract in methanol, ½ of the filtrate from each sample was nitrogen evaporated to dryness and redissolved in 0.5 ml DMSO for Ames assay (TA98+S9). The other half of each sample was handled in the same way, except that the SMSO preparation (0.5 ml) was treated with 4.9 ml of 0.1N HCl and 0.1 ml of 0.1M $NaNO_2$. The acidic mixture was incubated for 30 minutes at 37° C., and the nitrosation reaction stopped by neutralization to pH 7.0 with the addition of 2N NaOH. The sample was then passed through a 0.45 μm Millipore filter using glass syringe, collected in a test tube, and nitrogen evaporated to dryness. The residue was redissolved in 5 ml of methanol, nitrogen evaporated to dryness, and solubilized in DMSO for Ames assay (TA98+S9). If carboline mutagens have contributed to overall mutagenicity due to the presence of added L-trp, then acidic nitrosation of sample basic extract would result in fewer average revertant colonies/plate, or an increase in % inhibition by L-trp.

Mutagenicity assays

Ames *Salmonella typhimurium* tester strain TA98 was used in all assays for mutagenicity, and strains TA100, TA1538, and TA1535 were used additionally in selected studies. The S9 mix utilized in all assays contained 50 μl of S9 fraction/ml of S9 mix. The S9 fraction (40 mg protein/ml) was derived from Arachlor 1254-induced rat liver.

The assay was conducted by the addition of 0.1 ml of overnight culture of an appropriate tester strain to 0.5 ml of S9 mix, and either 100 μl of reflux sample, or a known concentration of IQ-mutagen reference compound in DEG or DMSO, then applied. The mixture was then incubated in a 37° C. water bath for 20 minutes. Molten top agar was added, and the mixture overlayed onto Vogel-Bonner agar plates. Plates were incubated at 37° C. for 48 to 72 hours. Results are expressed as average (avg.) revertant colonies/plate, as determined on an Artek Model 880 automatic colony counter. Average number of rev. col./plate must be triple that of medium (DEG or DMSO) control values to be considered significant. These determinations were performed by the In Vitro Systems Facility of the Naylor Dana Institute of White Plains, N.Y.

In the case of XAD-2 concentrated/acid base partitioned reflux samples, sample residue was redissolved in DMSO prior to removal of 100 μl aliquots for assay. All assays were conducted in triplicate.

PROCEDURE 1

The "complete" liquid-reflux model, consisting of glucose (35 mM)+glycine (70 mM)+creatinine (70 mM), was selected for use because the specific mutagens produced have been identified as 75% $MeIQ_x$ and 25% 7,8-$DiMeIQ_x$ by Jagerstad et al. (Jagerstad, M., Grivas, S., Olsson, K., Reutersward, A. L. Negishi, C., and Sato, S. (1986) Formation of food mutagens via Maillard reactions. In I. B. Knudsen (ed.), Progress in Clinical and Biological Research, vol. 206, Genetic Toxicology of the Diet. Alan R. Liss, Inc., New York, pp. 155–167). The "critical" model, threonine (70 mM)+creatinine (70 mM) provided for a simple, 2-component model of IQ-type mutagenicity yielding a major product, 2-amino-5-ethylidene-1-methylimidazole-4-one, and a minor product, 2-amino-1-methyl-5-propylideneimidazole-4-one. L-trp was added to each of the reflux models at several concentrations, ranging from 1.75 to 140 mM.

PROCEDURE 2

"Standard" 50 gram lean-ground beef patties were treated with 2.5 ml of a commercial steak sauce (2.5 ml of SS/side), to which had been added 0, 50, 75, 100, or 150 mg L-trp applied to both sides of the patty prior to initial broiling at an average temperature of 235° C. over a total of 10 minutes cooking time (5 min./side). After broiling, patties were homogenized in acetone and acid/base partitioned to basic extract in DMSO for Ames mutagenicity assay (TA98+S9). Additionally, ½ of the basic extract from the patty treated with 150 mg L-trp in 2.5 ml SS/side (2.07 mg/cm² surface area) was treated by acidic nitrosation to test for the presence of L-trp-derived carboline (non-IQ) type mutagens. (Tsuda, M., Negishi, C., Makino, R., Sato, S., Yamaizumi, Z., Hirayama, T. and Sugimura, T. (1985) Use of nitrite and hypochlorite treatments in determination of the contributions of IQ-type and non-IQ-type heterocyclic amines to the mutagencities in crude pyrolyzed materials. Mutat. Res., 147, 335-341).

PROCEDURE 3

"Standard" lean-ground beef patties were treated with 2.5 ml of SS/side, or 2.5 ml of SS to which had been added either 60 or 75 mg of L-trp (0.83 and 1.04 mg L-trp/cm$^2$, respectively) that was applied to both sides prior to initial frying of either side. Patties were fried in an electric frypan at an average temperature of 220° C. over 10 minutes total cooking time (5 min./side).

RESULTS

PROCEDURE 1

When the concentration of added L-trp was varied from 1.75 to 140 mM in the complete liquid reflux model, IQ-type mutagenicity was inhibited, in a dose-dependent fashion, over a range of 15 to 100% (FIG. 1; Table 1). L-trp also inhibited the IQ-type mutagenicity in the critical model in a dose-dependent fashion, from 3.5 mM (60% inhibition: 1290→515 avg rev. col./plate) to 70 mM (100% inhibition: 1290→40 avg. rev. col./plate) (FIG. 1; Table 1). In controls, the substitution of 70 mM L-trp for 70 mM glycine in the glucose+glycine+creatinine model, or for 70 mM threonine (thr) in the critical model, resulted in no significant level of mutagenicity in either system: 45, and 80 avg. rev. col./plate, respectively.

PROCEDURE 2

In the broiled beef model, where L-trp was mixed into steak sauce (SS) at various concentrations, and applied to both sides of 50 gram lean-ground beef patties prior to initial broiling, L-trp inhibited the formation of IQ-type mutagenicity, in a dose-dependent fashion, up to 100% at 75 mg of L-trp in 2.5 ml of SS/side (1.04 mg/cm$^2$) (FIG. 2; Table 2). Plain, untreated (without SS) control patty basic extract produced 515* avg. rev. col./plate, while untreated SS controls produced around 450* (a 13% reduction in mutagenic yield). Relative to either of these controls, 75 mg of L-trp in 2.5 ml SS/side resulted in a 100% inhibition of formation of IQ-type mutagenicity (120 avg. rev. col./plate).

While basic extract from patties treated on both side with 150 mg L-trp in 2.5 ml SS/side (2.07/mg/cm$^2$) prior to initial broiling resulted in 110 avg. rev. col./plate (100% inhibition), acidic nitrosation of this same extract resulted in 260* avg. rev. col./plate (a 42% inhibition). Had a significant level of carboline-type mutagens (Trp-P-1, Trp-P-2) been generated due to pyrolysis of the added L-trp under the broiling conditions of the present study (235° C.), then acidic nitrosation would have resulted in fewer avg. rev. col./plate (<110), not 250*; or in greater than 100% inhibition by L-trp. Thus, the data indicate no formation of significant levels of non-IQ (carboline) type mutagens present in the L-trp-treated broiled beef basic extract.

PROCEDURE 3

In the fried beef model, L-trp inhibited the formation of IQ-type mutagenicity, in a dose-dependent fashion, up to 100% at 75 mg L-trp in 2.5 ml SS/side (1.04 mg/cm$^2$) (Table 2). 60 mg L-trp in 2.5 ml SS/side (0.83 mg/cm$^2$) resulted in 23% inhibition compared with only 4% inhibition at 50 mg L-trp in 2.5 ml SS/side (0.69 mg/cm$^2$) in the broiled beef model. In both the broiled and fried beef models, both surfaces were treated prior to the start of cooking. The "dose-response" surves from both studies are quite similar, and in both a very sharp inhibitory response occurs between 50 and 75 mg of L-trp in 2.5 ml SS/side, or 100-150 mg total L-trp/patty (FIG. 3).

TABLE I.

The data presented from two typical studies show that increasing amounts of L-tryptophan progressively inhibit the formation of mutagens. A laboratory model for the browning reaction was used, involving a 2-hour boiling of glucose, glycine and the essential component creatinine in a solvent of diethylene glycol-water (95:5) at 150° C.

TABLE I

Inhibition of mutagenicity by L-trp in liquid-reflux models

| Model | mM L-trp added | TA98 + S9 Avg.rev.col./pl. per 0.1 ml reflux sample Study 1 | Study 2 | % Inhibition Study 1 | Study 2 |
|---|---|---|---|---|---|
| Complete[a] | 0 (control) | 545[b] ± 77 | 1170[b] ± 58 | | control |
| | 1.75 | 460[b] ± 70 (p = 0.23) | — | 15 | — |
| | 3.5 | 235[b] ± 17 (p = 0.007) | — | 57 | — |
| | 17 | 230[b] ± 5 (p = 0.006) | — | 58 | — |
| | 70 | — | 250[b] ± 8 (p < 0.001) | — | 78 |
| | 105 | — | 140[b] ± 16 (p < 0.001) | — | 100 |
| DEG neg. control[c] | | 50 | 70 | — | — |
| IQ (5 ng/pl) (positive control) | — | 960[b] | 1130[b] | — | — |

[a]Complete model consisted of glucose (35 mM) + glycine (70 mM) + creatinine (70 mM).
[b]Significant levels of mutagenicity (defined as 2 times background control levels) (mean ± standard error)
[c]Diethylene glycol - control

TABLE II

Dose-dependent inhibition of IQ-type mutagenicity in Salmonella typhimurium TA98 + S9 by L-tryptophan in fried and broiled lean-ground beef.

| Sample | Broiled beef model | | | Fried beef model | |
|---|---|---|---|---|---|
| | Avg.Rev. Col./Plate | | % Inhibition | Avg.Rev. Col./Pl. | % Inhibition |
| | Study 1. | Study 2. | | | |
| Plain patty control | $515^a \pm 15$ | — | | — | |
| $SS^b$ patty control | $450^a \pm 28$ ($p = 0.11$) | $280^a \pm 28$ | | $360^a \pm 21$ | |
| 50 mg L-trp/side (0.69 mg/cm$^2$) | — | $270^a \pm 13$ ($p = 0.34$) | 4 | — | |
| 60 mg L-trp/side (0.83 mg/cm$^2$) | — | — | | $280^a \pm 20$ ($p = 0.02$) | 23 |
| 75 mg L-trp/side (1.04 mg/cm$^2$) | — | $120 \pm 22$ ($p = 0.005$) | $100^c$ | $150 \pm 8$ ($p < 0.001$) | $100^c$ |
| 100 mg L-trp/side (1.38 mg/cm$^2$) | — | $110 \pm 5$ ($p = 0.02$) | | — | |
| 150 mg L-trp/side (2.07 mg/cm$^2$) | $115 \pm 7$ ($p < 0.001$) | — | $100^c$ | — | |
| DMSO control | 55 | 60 | | 60 | |
| IQ (5 ng/plate) | $635^a$ | $1265^a$ | | $1025^a$ | |

$^a$Significant level of mutagenicity (3 times DMSO control values) (mean ± standard error)
$^b$SS = steak sauce. In the broiled beef model, SS, with or without L-trp, was applied (2.5 ml/side or 0.83 ml/cm$^2$) to both patty surfaces prior to broiling side 1. In the fried beef model, SS, with or without L-trp, was applied (2.5 ml/side or 0.83 ml/cm$^2$) to side 1 prior to frying and to side 2 while side 1 was cooking.
$^c$100% inhibition in these studies is a decrease in mutagenic yield below the level of significance. To convert values to avg. rev. col./gm. meat wet weight, multiply Table values by 10, and divide by 50 gm.

TABLE II.

The data presented show that surface application of increasing amounts of L-tryptophan in a steak sauce to both sides of a hamburger prior to cooking gave a progressively decreased amount of mutagenic activity either upon broiling or frying. Optimal inhibition was found with amounts of L-tryptophan greater than 1.04 mg per square centimeter of the meat patty.

As noted above, FIG. 3 demonstrates that L-tryptophan applied to the surface of ground beef has an inhibiting effect on the formation of mutagens during frying in a pan or broiling in an oven. The data show that with levels of 75 mg or more of L-trp per side of ground beef, complete inhibition is obtained.

In laboratory models for browning reactions during frying of meat or fish, the relevant mechanisms have been described as shown in Tables IV, V, VI and VII. It is established in these mechanistic considerations that creatinine is the critical target of reactive intermediates, in the form of certain aldehydes, leading to the formation of IQ-type mutagens and carcinogens. As noted in Table IV, L-trp and related indoles inhibit the formation of IQ-type carcinogens by preferentially reacting with the intermediary aldehydes, so that the key reaction with creatinine is inhibited.

Tables III and IV show that various indoles related to L-trp can inhibit the formation of mutagens in the laboratory models. Tables V and VI record the effect in such models of another indole derivative, L-proline, or mixtures of L-pro and L-trp.

Thus, the illustrations show clearly that L-trp, L-pro, or mixtures thereof, as well as certain other indoles block the formation of IQ-type mutagens or carcinogens in laboratory models as well as during the realistic cooking, broiling or frying, of meat or fish. The mutagens or carcinogens are novel types of heterocyclic amines and imidazoazaarenes that form during various traditional customary cooking procedures such as frying, broiling, or baking that involve surface browning of the protein-aceous food.

Typically inhibitor mixtures of 75 mg of L-tryptophan in 2.5 ml of a commercial sauce or appropriate mixtures of L-tryptophan and L-proline in that volume of sauce are applied to the surface of the ground beef, to provide the desired amount of approximately 1 mg of inhibitor per cm$^2$ of surface area. Frying or broiling are carried out in a standard manner as will be practiced in a home kitchen, or a commercial establishment. Following cooking, the patties are allowed to cool, the surfaces containing the brown part are scraped, or alternatively, the entire patty is homogenized and extracted. The extract is prepared for the determination of mutagenic activity using the applicable standard techniques. The mutagenic activity can be isolated and demonstrated to be in a basic fraction as described in the literature. Where inhibitors such as L-tryptophan are used, mutagenic activity is not present or is present to a lesser extent in this basic fraction (Tables I–VI).

TABLE III.

Inhibition of IQ-like (TCP) mutagenicty by various indoles in the threonine+creatinine reflux model.

The data presented show that a number of different indoles inhibits the formation of mutagenic activity in a simplified laboratory model for the browning reaction, consisting in heating threonine (thr) and creatinine in a vehicle for two hours at 150° C.

TABLE III

Inhibition of IQ-like (TCP) mutagenicity by various indoles in the threonine + creatinine reflux model.

| Model (70 mM) | Inhibitor (70 mM) | Experiment 1 | Experiment 2 | Experiment 3 |
|---|---|---|---|---|
| thr + creatinine | control | $1200^a \pm 48$ | $1360^a \pm 29$ | $1015^a \pm 123$ |
| thr + creatinine | L-tryptamine | $675^a \pm 44 (45\%)^b$ | — | — |
| thr + creatinine | indole | $530^a \pm 92 (60\%)$ | — | — |
| thr + creatinine | indole-3-carbinol | — | $240^a \pm 3 (85\%)$ | — |

TABLE III-continued

Inhibition of IQ-like (TCP) mutagenicity by various indoles in the threonine + creatinine reflux model.

| Model (70 mM) | Inhibitor (70 mM) | Experiment 1 | Experiment 2 | Experiment 3 |
|---|---|---|---|---|
| thr + creatinine | L-Trp | 190[a] ± 11 (90%) | 240[a] ± 7 (85%) | 135 ± 5 (90%) |
| thr + creatinine | N-acetyl-trp | — | — | 155[a] ± 9 (90%) |
| thr + creatinine | indole-3-carboxaldehyde | 48 ± 3 (100%) | — | — |
| DEG negative control | — | 60 ± 2 | 55 ± 3 | 40 ± 5 |
| IQ (5 ng/plate) | | 830[a] ± 13 | 815[a] ± 27 | 1600[a] ± 210 |

[a] significant levels of mutagenicity (2 times background control) ± SE (standard error) of the mean (n = 3)
[b] % inhibition
All substrates (70 mM) refluxed in diethylene glycol (DEG):5% distilled water at 150° C. for 2 hrs.

TABLE IV.

Inhibition of IQ-type (MeIQ$_x$, etc.) mutagenicity by various indoles in the glucose+glycine+creatinine complete reflux model.

The data presented show that a number of different indoles inhibit the formation of IQ-type mutagenic activity in an appropriate laboratory model for the browning reaction, consisting of heating glucose, glycine, and creatinine in a vehicle for two hours at 150° C.

TABLE IV

Inhibition of IQ-type (MeIQ$_x$, etc.) mutagenicity by various indoles in the glucose + glycine + creatinine complete reflux model

| Model (35 mM) | (70 mM) | (70 mM) | Ingredient (70 mM) | TA98 + S9 Avg.Rev.Col./Plate Exp. 1 | Exp. 2 | Inhibition % Exp. 1 | Exp. 2 |
|---|---|---|---|---|---|---|---|
| Glucose + | Glycine + | Creatinine | Control | 850[a] ± 121 | 760[a] ± 45 | controls | |
| Glucose + | Glycine + | Creatinine | + N-acetyl-trp | — | 530[a] ± 39 | — | 30 |
| Glucose + | Glycine + | Creatinine | + Indole-3-carbinol | 570[a] ± 156 | — | 35 | — |
| Glucose + | Glycine + | Creatinine | + Indole | 380[a] ± 40 | — | 60 | — |
| Glucose + | Glycine + | Creatinine | + L-tryptamine | 350[a] ± 42 | — | 65 | — |
| Glucose + | Glycine + | Creatinine | + L-trp | 205[a] ± 7 | — | 80 | — |
| Glucose + | Glycine + | Creatinine | + Indole-3-carbox-aldehyde | 100 ± 14 | — | 100 | — |
| DEG negative control | | | — | 70 ± 2 | 50 ± 1 | — | — |
| IQ (5 ng/plate: positive control) | | | — | 1260[a] ± 128 | 2320[a] ± 54 | — | — |

[a] significant levels of mutagenicity (2 times background control) ± SE (standard error) of the mean (n = 3)
All substrates (70 mM) refluxed in diethylene glycol containing 5% distilled water at 150° C. for 2 hrs.

TABLE V.

Percent inhibition by L-proline in the threonine+-creatinine model.

The data presented show that L-proline and a mixture of L-proline and L-tryptophan inhibit the formation of mutagenic activity in the simplified laboratory model for the browning reaction, consisting in heating threonine (thr) and creatinine in a vehicle for two hours at 150° C.

TABLE V

Percent inhibition by L-proline in the threonine + creatinine model

| Ingredients (mM) | TA98 + S9 Avg.Rev.Col./Plate Exp. 1 | Exp. 2 | % Inhibition Exp. 1 | Exp. 2 |
|---|---|---|---|---|
| Cr (70) + L-thr (70) | 1635[a] | 2225[a] | — | — |
| L-thr (70) + L-pro (70) | 560[a] | — | 70 | — |
| L-pro (70) | — | 260[a] | — | 94 |
| L-pro (105) | — | 250[a] | — | 95 |
| L-pro (140) | — | 265[a] | — | 94 |
| DEG neg. control | 45 | 70 | — | — |
| 5 ng IQ/plate pos. control | 760[a] | 1210[a] | — | — |

[a] Significant level of mutagenicity where significance is 2-times DEG neg. control value. 100% inhibition would indicate reduction in mutagenicity to below level of significance as defined.

TABLE VI.

Percent inhibition by L-proline in the glucose+-glycine+creatinine model.

The data presented show that L-proline or L-tryptophan, or mixtures thereof, inhibit the formation of mutagenic activity in an appropriate laboratory model for the browning reaction, consisting of heating glucose, glycine, and creatinine in a vehicle for two hours at 150° C.

TABLE VI

Percent inhibition by L-proline in the glucose + glycine + creatinine model.

| Ingredients (mM) | TA98 + S9 Avg.Rev.Col./Plate Exp. 1 | Exp. 2 | Exp. 3 | % Inhibition Exp. 1 | Exp. 2 | Exp. 3 |
|---|---|---|---|---|---|---|
| control (gluc + gly + cr) | 1590[a] | 1665[a] | 590[a,b] | — | — | — |
| Pro (7) | 1460[a] | — | — | 8 | — | — |
| Pro (35) | 1330[a] | — | — | 16 | — | — |
| Trp (7) | 1015[a] | — | — | 35 | — | — |
| Pro (7) + Trp (7) | 920[a] | — | — | 50 | — | — |
| Pro (35) + Trp (7) | 460[a] | — | — | 75 | — | — |

TABLE VI-continued

Percent inhibition by L-proline in the glucose + glycine + creatinine model.

| | TA98 + S9 Avg.Rev.Col./Plate | | | % Inhibition | | |
|---|---|---|---|---|---|---|
| Ingredients (mM) | Exp. 1 | Exp. 2 | Exp. 3 | Exp. 1 | Exp. 2 | Exp. 3 |
| Pro (35) + Trp (14) | — | 245[a] | — | — | 90 | — |
| Pro (35) + Trp (35) | — | — | 160[a] | — | — | 80 |
| Pro (70) | — | 720[a] | — | — | 60 | — |
| Trp (70) | — | — | 160[a] | — | — | 80 |
| Pro (105) | — | 740[a] | — | — | 55 | — |
| Pro (140) | — | 1045[a] | — | — | 40 | — |
| DEG neg control | 60 | 45 | 60 | — | — | — |
| 5 ng IQ/plate pos.con. | 915[a] | 950[a] | 830[a] | — | — | — |

[a]Significant level of mutagenicity where significance is 2-times DEG neg. control value. 100% inhibition would indicate reduction in mutagenicity to below level of significance as defined. Reflux model used contains gluc (35 mM) + gly (70 mM) + cr (70 mM) in diethylene glycol (DEG):5% distilled water: 150° C. for 2 hr. This model has been shown to produce 80% MeIO$_x$ and 20% 7,8-DiMeIO$_x$.

[b]Controls vary from experiment to experiment as a function of indicator organism age and other factors; experimental value are thus relative to respective study controls.

The additional significant discovery was made that a combination of relatively small amounts of proline (one-tenth of the amount of the creatinine present) together with one-tenth of L-tryptophan (i.e., the same as the amount of L-pro) were able to reduce the formation of mutagens by 50%. When the respective amounts of L-pro and L-trp was equivalent to one-half of the amount of creatinine present, the inhibition was 80-90%.

Based on this further discovery, the following is noted:

1. A procedure has been developed to formulate certain compounds generally belonging to the indole class of chemicals, specifically L-proline, to be applied in amounts of approximately 1 mg/cm$^2$ of surface to various meats, fish, and related protein-containing foodstuffs prior to cooking by frying, broiling, or baking and so forth in order to prevent the formation of mutagens/carcinogens belonging to the class of amino-imidazo-azaarenes and methylimidazoquinolines and quinoxalines during such cooking.
2. The application of smaller amounts of L-proline in quantities such as but no less than 0.5 mg/cm$^2$ of surface, together with the previously described L-tryptophan in amounts such as but no less than 0.5 mg/cm$^2$ of surface area are even more effective than L-proline L-tryptophan by itself.
3. The inhibitors, specifically, L-proline and/or L-tryptophan alone, or in a mixture can be sprinkled on the foodstuffs as dried powders.
4. The inhibitors alone or in mixtures can be formulated in a vehicle such as a commercial steak sauce or in a water solution of flavor or in gelatin or other vehicles to permit the uniform application of the recommended amounts of inhibitors to the surfaces of meat or fish.
5. These inhibitors can be applied to protein-containing foods customarily consumed such as beef, lamb, pork, veal, fowl, or fish of various types prior to cooking. These foods can be as such or in ground form including hamburger, meatloaf, or the like.
6. The inhibiting mixture is applied to all sides of the surfaces of foodstuff prior to the cooking. The treated food is subjected to the usual type of cooking, such as frying, broiling, or baking, or the like and it will be found that the pretreatment of foods using the procedures described will contain much smaller amounts of the mutagens/carcinogens named, that normally would form during cooking of such foods without the recommended treatment.

TABLE VII

Percent inhibition by L-proline in the glucose + glycine + creatinine model.

| | TA98 + S9 Avg.Rev.Col./Plate | | | % Inhibition | | |
|---|---|---|---|---|---|---|
| Ingredients (mM) | Exp. 1 | Exp. 2 | Exp. 3 | Exp. 1 | Exp. 2 | Exp. 3 |
| control (gluc + gly + cr) | 1590[a] | 1665[a] | 590[a,b] | — | — | — |
| Pro (7) | 1460[a] | — | — | 8 | — | — |
| Pro (35) | 1330[a] | — | — | 16 | — | — |
| Trp (7) | 1015[a] | — | — | 35 | — | — |
| Pro (7) + Trp (7) | 820[a] | — | — | 50 | — | — |
| Pro (35) + Trp (7) | 460[a] | — | — | 75 | — | — |
| Pro (35) + Trp (14) | — | 245[a] | — | — | 90 | — |
| Pro (35) + Trp (35) | — | — | 160[a] | — | — | 80 |
| Pro (70) | — | 720[a] | — | — | 60 | — |
| Trp (70) | — | — | 160[a] | — | — | 80 |
| Pro (105) | — | 740[a] | — | — | 55 | — |
| Pro (140) | — | 1045[a] | — | — | 40 | — |
| DEG neg control | 60 | 45 | 60 | — | — | — |
| 5 ng IQ/plate pos.con. | 915[a] | 950[a] | 830[a] | — | — | — |

[a]Significant level of mutagenicity where significance is 2-times DEG neg. control value. Reflux model used contains gluc (35 mM) + gly (70 mM) + cr (70 mM) in diethylene glycol (DEG):5% distilled water: 150° C. for 2 hr.

[b]Controls vary from experiment to experiment as a function of indicator organism age and other factors; experimental value are thus relative to respective study controls.

It has also been discovered as noted above that L-proline by itself and together with L-tryptophan is effective in blocking the formation of mutagens and carcinogens having the general chemical structure of 2-amino-3- methylimidazo[4,5-f]quinoline (IQs) and quinoxalines (IQ$_x$s). This entire class of compounds IQs and IQ$_x$s, belonging to a completely new type of mutagens and carcinogens of the aminoimidazoazaarene type belonging to the class of heterocyclic amines, was discovered by Sugimura of the National Cancer Center in Tokyo in 1977 (see Sugimura T: MUTATION RES 150:33–41, 1985).). Applicants have postulated that this type of agent formed during cooking may be the carcinogen associated with important forms of human cancer (Weisburger JH: ISI Atlas Sci Pharmacology 1:162–7, 1987.) For this reason, efforts were exerted to perform research on the mode of formation of this type of agent during cooking with emphasis on methods that were effective in blocking or reducing the formation of the carcinogens. Thus, it was first discovered that the well-known essential amino acid tryptophan could block the formation of these mutagens and carcinogens under laboratory situations and during the realistic cooking of meats such as ground meat or steaks and so forth when applied to the surface of the meat prior to cooking. It has been demonstrated that these carcinogens form during the browning reaction at the surface of the meat being cooked. It was thus shown that it was essential to have the inhibitors present at the surface rather than throughout the meat or foodstuff sample.

While examining the mechanisms whereby L-tryptophan exerted its inhibiting action, it was realized that the most likely structure featured within the L-tryptophan molecule was the indole ring, although further reactions at other sites of the molecule have not been totally ruled out. Thus, another amino acid with an indole ring, L-proline, was studied for inhibiting action and such an effect was indeed demonstrated in laboratory models for the browning reaction (Tables V and VII). The data show that L-proline, added in equal parts to the key reactant in the browning reaction, namely, creatinine, was able to block the formation of mutagens by 60% or 70%.

The inhibiting mixture is applied to all sides of the surfaces of foodstuff prior to the cooking, such as frying, broiling, or baking or the like, and it will be found that the pretreatment of the foods using the procedures described will contain much smaller amounts of the mutagens/carcinogens named, that normally would form during cooking of such foods without the recommended treatment.

The drawings and tables illustrate that the formation of IQ-type mutagens was inhibited in a dose-dependent fashion by indole-type compounds, especially the amino acids L-trp and L-pro individually or in mixtures. These reactions are entirely specific for the reasons mentioned in the background section, namely, that L-tryptophan, L-proline, and certain indoles react preferentially with intermediate products formed by heating during frying, broiling, or baking of meat or fish. Without the recommended indole additions, such intermediates would react with creatinine to form IQ-type mutagens and carcinogens. This action by indoles blocks formation of this class of carcinogenic aminomethylimidazoquinolines and -quinoxalines and related imidazoazaarenes.

In conclusion, indoles, such as L-tryptophan and L-proline and mixtures thereof, inhibited almost completely the formation during cooking of mutagens and carcinogens of the imidazoazaarene-type, when added to various liquid reflux model systems or to meat or fish of various types prior to frying or broiling. Because L-tryptophan or L-proline are natural amino acids and nontoxic substances, those amino acids or related indoles can be prudently employed to virtually eliminate the formation of IQ-type carcinogens in proteinaceous foods by application to both surfaces of the foods mentioned prior to cooking.

What is claimed is;

1. A method of inhibiting the development of mutagens/carcinogens during the cooking of a protein containing foodstuff comprising applying L-proline to the foodstuff in an amount sufficient to inhibit the development of mutagens/carcinogens during the cooking of the foodstuff, and cooking the foodstuff with the L-proline thereon.

2. A method as claimed in claim 1 comprising broiling the foodstuff with the L-proline thereon.

3. A method as claimed in claim 1 comprising frying the foodstuff with the L-proline thereon.

4. A method as claimed in claim 1 comprising applying the L-proline to the surface of the foodstuff.

5. A method as claimed in claim 4 wherein the foodstuff has first and second sides, comprising applying the L-proline to both said sides.

6. A method as claimed in claim 4 comprising applying the L-proline to the surface in an amount at least in the order of magnitude of 0.69 mg per cm. sq.

7. A method as claimed in claim 1 wherein the foodstuff is meat or fish.

8. A method as claimed in claim 1 wherein the inhibiting of mutagens is constituted by the inhibiting of IQ-type carcinogens.

9. A method as claimed in claim 1 wherein the foodstuff is beef, lamb, pork, fowl or fish.

10. A method as claimed in claim 1 wherein the foodstuff is hamburger.

11. A method as claimed in claim 5 wherein one of the sides at a time is directly exposed to heat, comprising applying the L-proline to both sides before the heat is applied substantially to either side.

12. A method as claimed in claim 1 comprising baking the foodstuff with L-proline.

13. A method as claimed in claim 1 comprising applying L-tryptophan to the foodstuff with the L-proline.

14. A method as claimed in claim 4 comprising applying L-tryptophan to the foodstuff with the L-proline.

15. A food item comprising a protein containing foodstuff and a mutagen/carcinogen inhibitor thereon, said inhibitor including L-proline in an amount sufficient to inhibit the formation of the mutagens/carcinogens during cooking of the foodstuff.

16. A food item as claimed in claim 15 comprising a carrier for the L-proline.

17. A food item as claimed in claim 16 wherein the L-proline is soluble or suspended in said carrier.

18. A food item as claimed in claim 16 wherein said carrier is a sauce adapted for use with foodstuff.

19. A foodstuff prepared as claimed in claim 1.

20. A food item as claimed in claim 15 further comprising L-tryptophan with the L-proline in an amount to inhibit the formation of the mutagens/carcinogens.

* * * * *